US012591443B2

(12) United States Patent (10) Patent No.: US 12,591,443 B2
Gasperowicz et al. (45) Date of Patent: Mar. 31, 2026

(54) SYSTEM AND METHOD FOR FACILITATING PARTICIPATION IN A BLOCKCHAIN ENVIRONMENT

(71) Applicant: OAKnode, Inc., New York, NY (US)

(72) Inventors: Marcin Gasperowicz, New York, NY (US); Nina Wieczorek, New York, NY (US)

(73) Assignee: OAKnode, Inc., New York, NY (US)

( * ) Notice: Subject to any disclaimer, the term of this patent is extended or adjusted under 35 U.S.C. 154(b) by 539 days.

(21) Appl. No.: 17/334,126

(22) Filed: May 28, 2021

(65) Prior Publication Data

US 2022/0121466 A1 Apr. 21, 2022

Related U.S. Application Data

(63) Continuation of application No. PCT/SG2019/050591, filed on Nov. 29, 2019.

(60) Provisional application No. 63/060,387, filed on Aug. 3, 2020, provisional application No. 62/859,512, filed on Jun. 10, 2019.

(51) Int. Cl.
| *G06F 9/455* | (2018.01) |
| *G06F 9/445* | (2018.01) |
| *G06F 9/50* | (2006.01) |

(52) U.S. Cl.
CPC ...... *G06F 9/45558* (2013.01); *G06F 9/44505* (2013.01); *G06F 9/5077* (2013.01); *G06F*

*2009/45562* (2013.01); *G06F 2009/4557* (2013.01); *G06F 2009/45595* (2013.01)

(58) Field of Classification Search
CPC ............. G06F 9/45558; G06F 9/44505; G06F 9/5077; G06F 2009/45562; G06F 2009/4557; G06F 2009/45595
See application file for complete search history.

(56) References Cited

U.S. PATENT DOCUMENTS

| 2008/0276231 | A1* | 11/2008 | Huang | ..................... G06F 8/71 717/145 |
| 2016/0043892 | A1* | 2/2016 | Hason | ................... H04L 41/046 709/223 |
| 2017/0168778 | A1* | 6/2017 | Brandys | ................... G06F 8/60 |
| 2017/0214550 | A1* | 7/2017 | Kumar | ................ H04L 41/5045 |
| 2018/0032383 | A1* | 2/2018 | Surcouf | ................ H04L 9/3239 |

OTHER PUBLICATIONS

Nakamoto, Satoshi, "Bitcoin: A Peer-to-Peer Electronic Cash System," http://www.bitcoin.org/bitcoin.pdf, pp. 1-9, Jul. 4, 2010.

* cited by examiner

*Primary Examiner* — Wissam Rashid
(74) *Attorney, Agent, or Firm* — Perkins Coie LLP

(57) ABSTRACT

The present invention relates to a system and method for facilitating participation in a blockchain environment. A node (also referred to as "OAK Node") installed in the user's device can be connected to other nodes via peer-to-peer networking. At least one program, for example at least one of Store, CLI, 3rd party software and remote control, can use OAK API to trigger various functions of the OAK Node.

20 Claims, 8 Drawing Sheets

SYSTEM AND METHOD FOR FACILITATING PARTICIPATION IN A BLOCKCHAIN ENVIRONMENT

CROSS-REFERENCE TO RELATED APPLICATIONS

Figure 1:
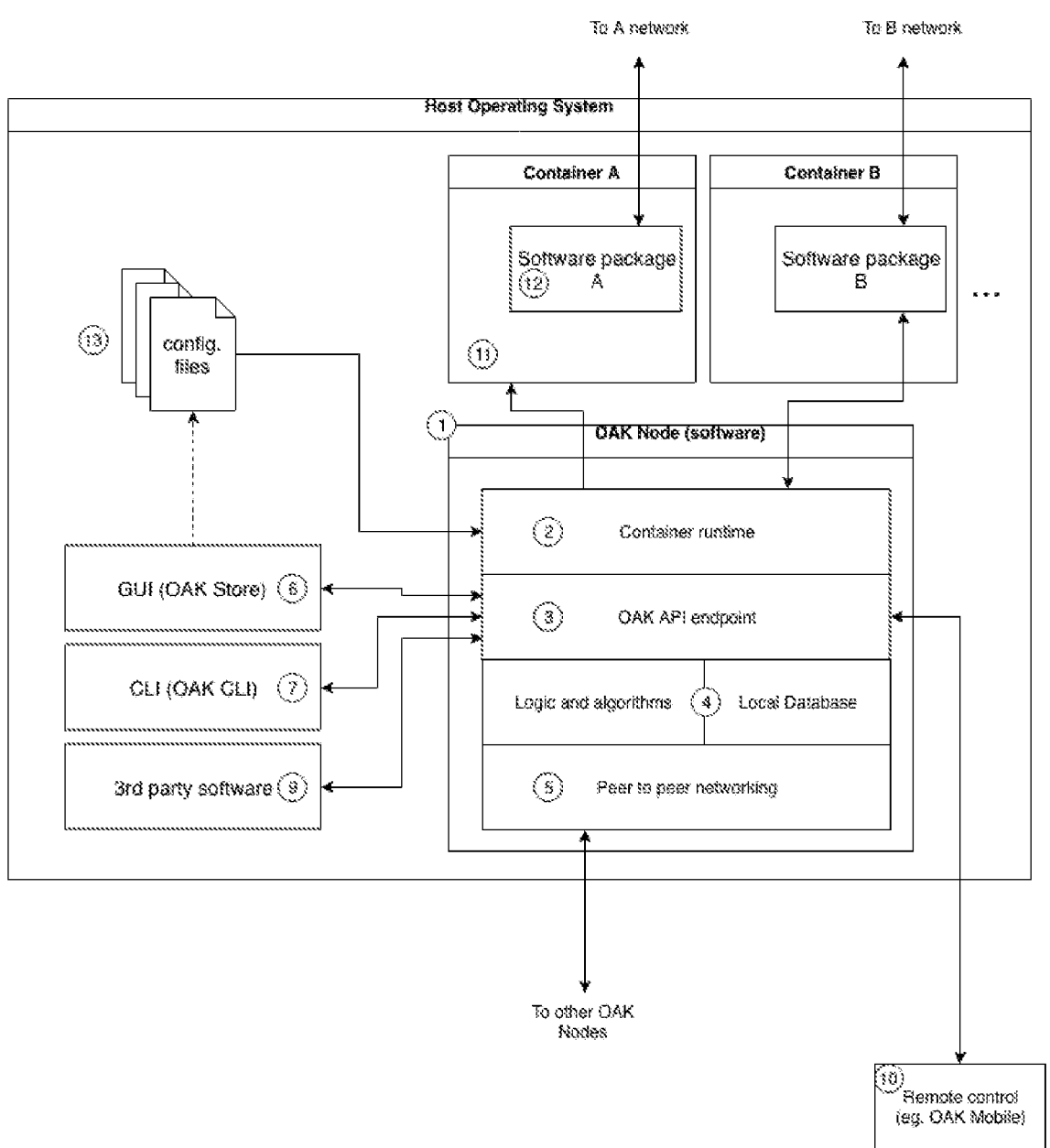

This application claims the benefit of priority to U.S. Provisional Application No. 63/060,387 filed on Aug. 3, 2020, and is a continuation of International Patent Application No. PCT/SG19/50591 filed on Nov. 29, 2019, which claims the benefit of priority to U.S. Provisional Application No. 62/859,512 filed on Jun. 10, 2019, and benefit of priority to Singapore patent application Ser. No. 10/201,810756U filed on Nov. 30, 2018, the entire disclosure of each of these applications is incorporated herein by reference.

1. TECHNICAL FIELD

The present invention generally relates to the technical field of computer networks, and more specifically to a system and method for operating computing nodes in a networked environment.

2. BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header that is a hash digest of all the transaction identifiers within the block. The block header is recorded as the first transaction in the next block in the chain, creating a mathematical hierarchy called a "blockchain". To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network may have a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) involving the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by the car's vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

To enable more complex transactions than bitcoin can support, some systems use "smart contracts". A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

From a historical perspective, the main promise behind blockchain was that it is decentralized, inclusive and peer-to-peer. To achieve a true decentralization, everyone should be able to join and support any network by becoming a node. Generally, the more nodes are participating in the network, the more resilient the network is. Also, running nodes of the protocol is required by anyone who is developing applications on top of blockchain (e.g., exchanges, wallets or any other decentralized applications).

However, becoming a node in the network is not easy. Typically, the developer is faced with a complex Github tutorial and needs to complete a complex process of configuring, updating and maintaining a piece of blockchain software. This is difficult, error-prone, or even impossible for a non-technical person to accomplish. Even for a technical person (a developer) this process is still time consuming, error-prone and manual and has to be repeated for every network as there is no unified way of setting up nodes for multiple networks available in the prior art.

An additional level of complexity is introduced when a node needs to be set up in a network which requires not one but a cluster of nodes talking to each other. This type of setup may require hiring a DevOps person/team and can take months to set up. This is partially because the available Container Orchestration solutions, such as Kubernetes, Docker or Terraform, are difficult to use and each provide only a certain subset of capabilities.

Due to the above, the Blockchain software (nodes and/or related software) which needs to be run by active participants of Blockchain networks (miners, stakers, developers, supporters, investors and/or enthusiasts) is relatively difficult to set up and maintain. On the one hand, this is due to the field being relatively young, but also due to sparse documentation targeted at insiders, the complicated underlying field of knowledge and rapid changes in the software itself.

Some of these problems could be solved by the use of Containerization. Generally speaking, Containerization is a method of packaging software together with its intended configuration and/or dependencies so that it can be transferred and executed relatively easily and in a wide range of environments with little or no additional work. However, deep expert knowledge is required for creating reusable Container Images, but it is not required for running them. Nowadays, Containerization is utilized extensively in Cloud computing and development environments where it allows developers and operators to quickly deploy and manage their own software or third party services such as databases etc. Most popular Container engines and orchestrators, such as Docker and Kubernetes, are intended for professional use by Software Engineers, DevOps Engineers and Systems Administrators. This makes existing solutions not suitable for technological laymen who need to run Blockchain software for their own needs.

It is therefore the technical problem underlying embodiments of the present invention to provide a more efficient way of setting up, orchestrating and/or monitoring an infrastructure of computing nodes in a networked environment, thereby at least partly overcoming the above explained disadvantages of the prior art.

3. SUMMARY OF THE INVENTION

The invention is defined in the independent claims. In the following, the parts of the description and drawings referring to embodiments which are not covered by the claims are not presented as embodiments of the invention but as background art or examples useful for understanding the invention.

Certain embodiments of the invention provide a solution to the above-explained problems of the prior art based on Containerization technology, which lowers the barrier of entry for people interested in Blockchain while improving upon existing solutions in several ways.

In one embodiment, a system for operating one or more computing nodes in a networked environment is provided. The system may comprise a management node comprising a container runtime, the container runtime operable to create and/or execute one or more containers, each container providing a runtime environment for at least one software module.

In a further embodiment, a computer-implemented method for operating one or more computing nodes in a networked environment is provided. The method may comprise creating, by a container runtime of a management node, one or more containers, each container providing a runtime environment for at least one software module.

In yet another embodiment, a computer program is provided, the computer program comprising instructions for implementing any of the methods disclosed herein.

A further embodiment provides a non-transitory computer-readable medium storing computer-executable code for operating one or more computing nodes in a networked environment, the code executable by a processor to create, by a container runtime of a management node, one or more containers, each container providing a runtime environment for at least one software module.

Further aspects of the invention are defined in the appended claims.

With embodiments of the invention, several important technical advantages can be achieved, such as for example and without limitation:

A management node provided by embodiments of the invention (also referred to as "OAK Node") does not require expert knowledge from the end-user, whereas other solutions are still targeted to professionals. OAK Node is targeted to all popular Operating Systems including MacOS, Windows and Linux running on a wide range of hardware and/or virtual hardware, including but not limited to Cloud environments in any way, whereas other solutions are mainly targeted at Linux and specialized Cloud environments.

In certain embodiments, an OAK Node may employ its own configuration language and/or executive which improves upon existing solutions: OAK Manifests may be composable, meaning that two or more unrelated Manifests can be composed to produce a new one. OAK Manifests may not only describe the runtime environment, but also procedures and/or variables associated with particular workload/container. OAK Manifests may be freely shared and/or reused while being independent from runtime context and/or underlying runtime as long as the runtime supports containers. OAK Manifests may be signed by their vendors and/or other parties to ensure that the software they reference is verified and valid. OAK Manifests may be extensible, i.e., the language might be developed while supporting full backwards compatibility.

In certain embodiments, an OAK Node may not use a centralized repository for storing the Manifests and/or Container Images, but these artefacts may be shared in a peer-to-peer manner amongst all or some OAK Nodes. This makes systems based on OAK Node independent of outside services, such as DockerHub.

In certain embodiments, an OAK Node may provide the workloads with built-in facilities, such as Service Discovery.

In certain embodiments, an OAK Node may provide programmatic control over the Containers, the workloads running inside them, or both.

4. SHORT DESCRIPTION OF THE DRAWINGS

Figure 2:
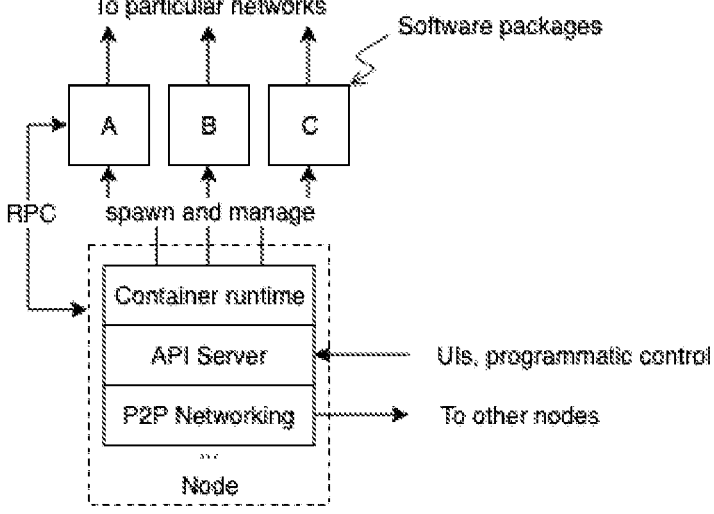
Figure 3:
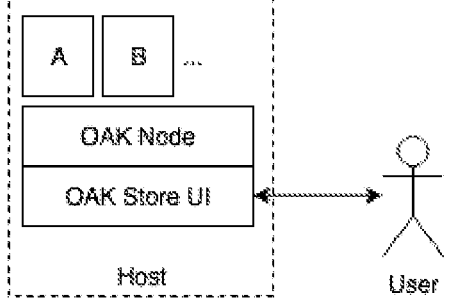
Figure 4:
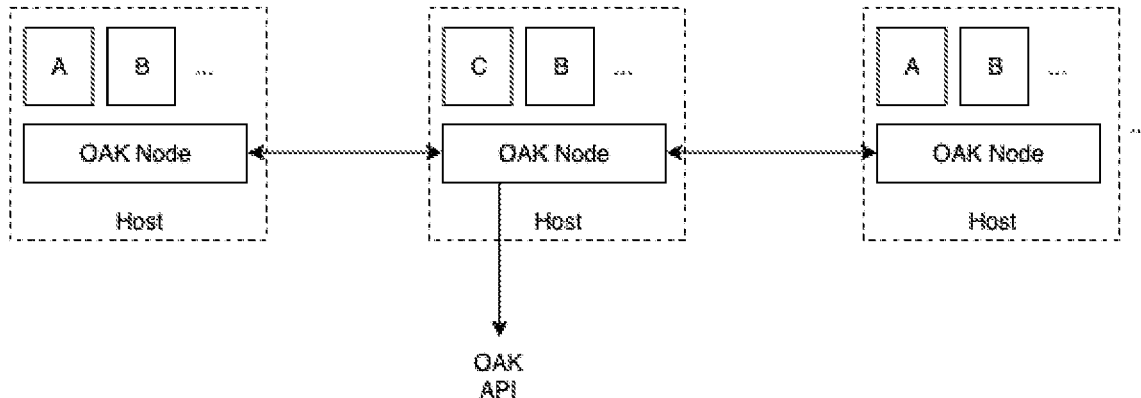
Figure 5:
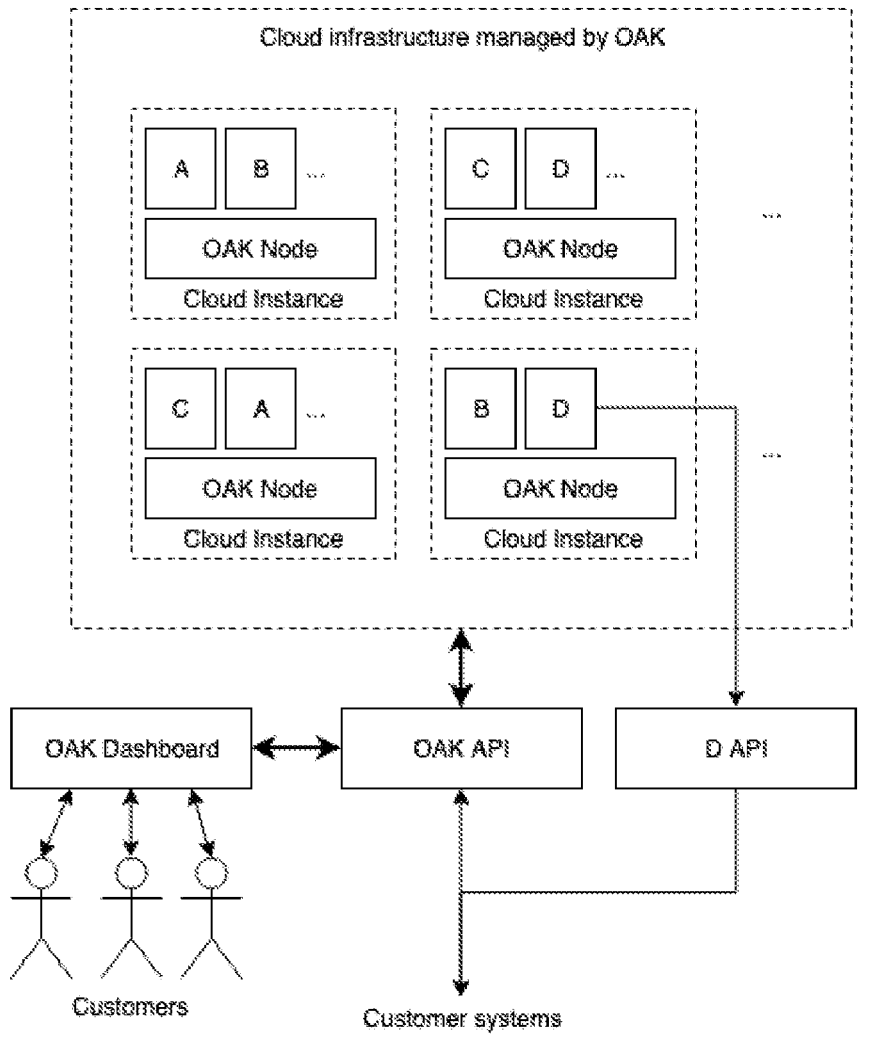
Figure 6:
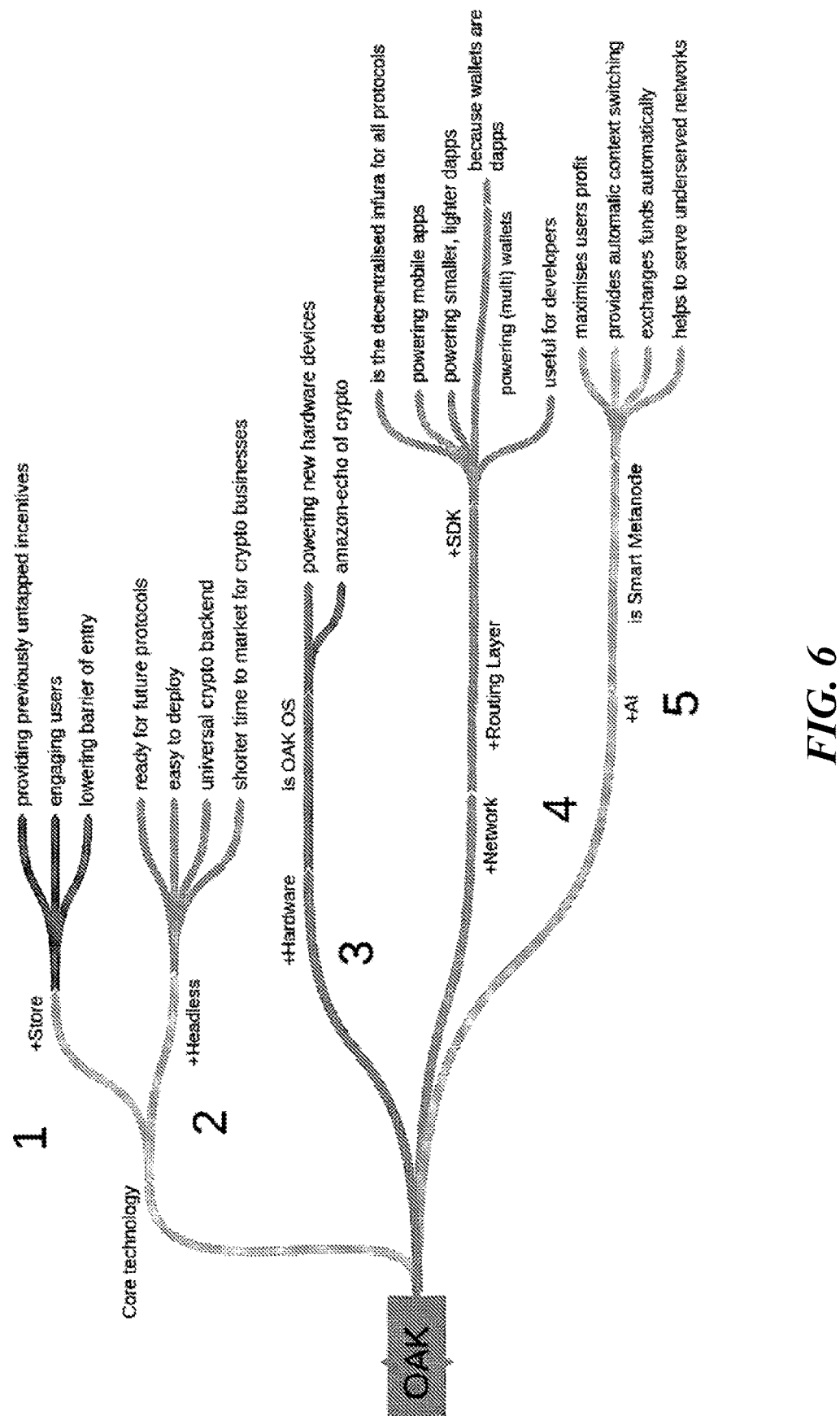
Figure 7:
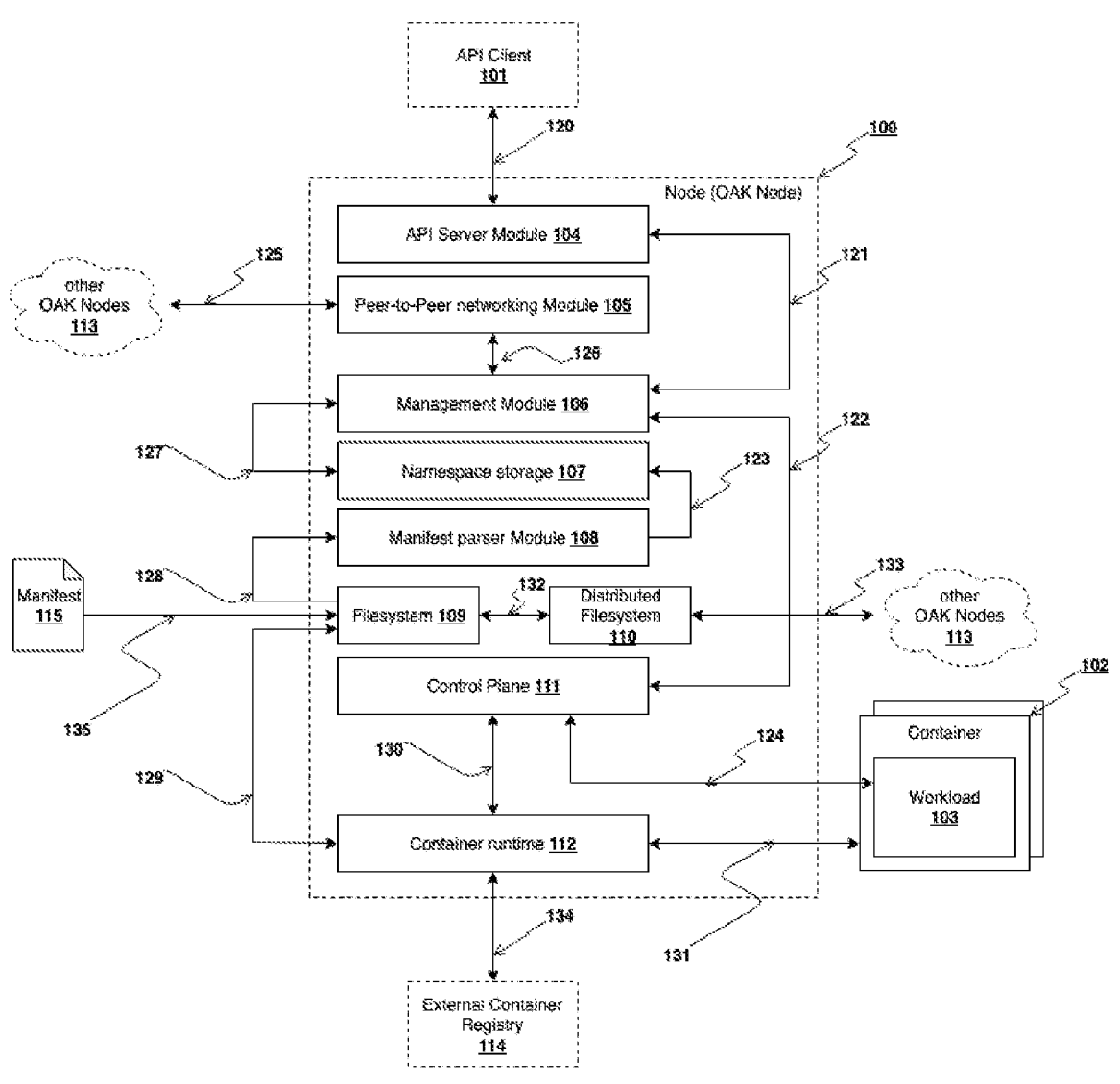
Figure 8:
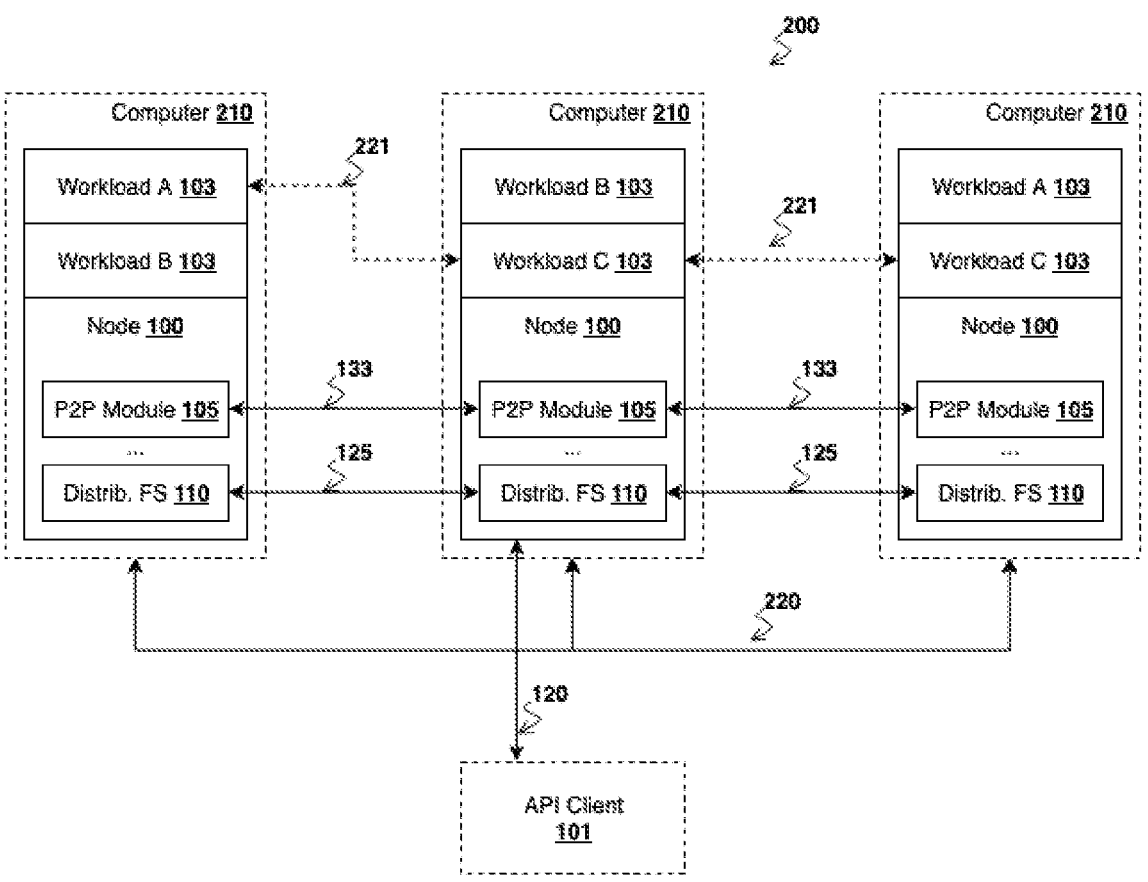
Figure 9:
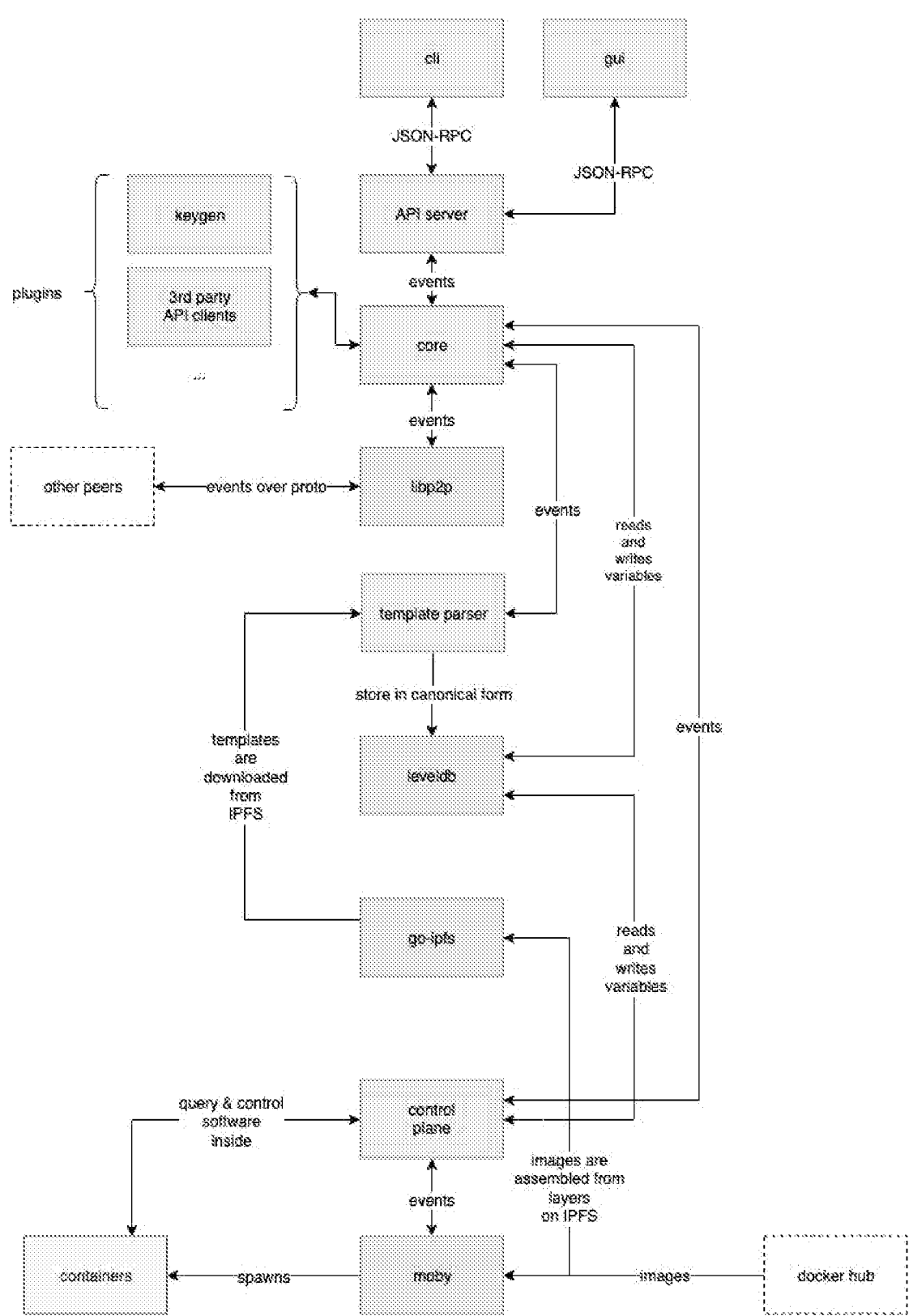
Figure 10:
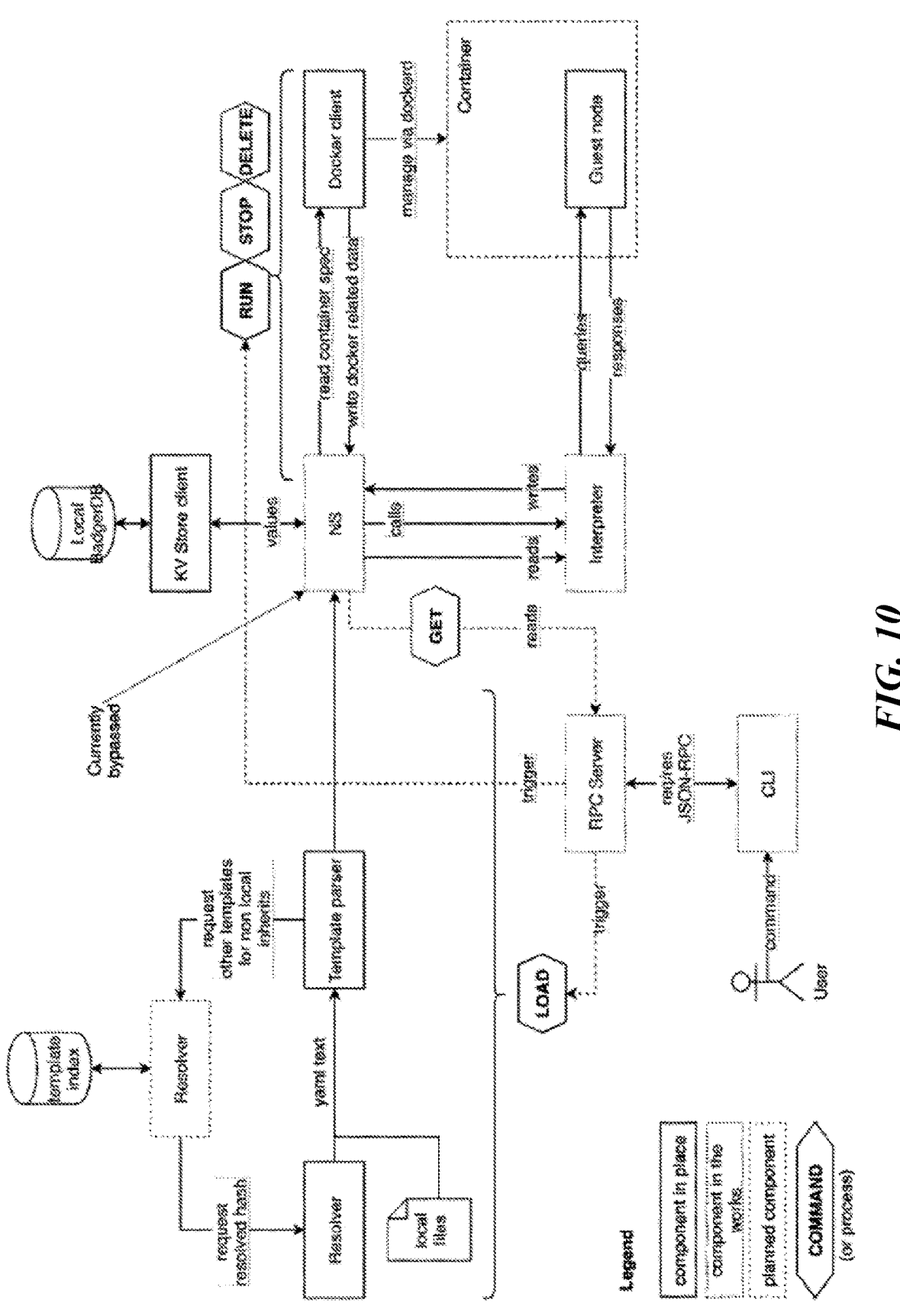

In the following detailed description, presently preferred embodiments of the invention are further described with reference to the following figures:

FIG. 1: A schematic block diagram illustrating a computer system according to embodiments of the invention;

FIG. 2: A more detailed view of an OAK Node according to embodiments of the invention;

FIG. 3: Exemplary application "App store for nodes" according to embodiment of the invention;

FIG. 4: Exemplary application "OAK Headless" according to embodiment of the invention;

FIG. 5 Exemplary application "OAK SaaS" according to embodiment of the invention;

FIG. 6: Exemplary listing of further functionalities of embodiments the invention;

FIG. 7: An OAK node according to embodiments of the invention;

FIG. 8: An OAK network according to embodiments of the invention;

FIG. 9: Exemplary 'OAKnode V2' according to embodiment of the invention;

FIG. 10: Exemplary embodiments of 'OAKnode V2'.

5. DETAILED DESCRIPTION

Embodiments of the invention provide a particularly efficient way of setting up a node infrastructure which can be applied to a distributed ledger, such as a blockchain, but also can be applied to any other application as it provides a new way of orchestration and node monitoring. With embodiments of the invention, new protocols can be added in a matter of minutes rather than weeks and even users with little or no technical experience can set up highly available, multi node, geographically distributed cloud instances with one click.

Certain embodiments of the invention relate to a computer program (also referred to as "OAK Node" or "management node") which facilitates and/or automates acquisition, deployment and/or maintenance of computer software on a single and/or on multiple computers. Automation of acquisition, deployment and/or maintenance may be performed based on human and/or tool-generated Manifest file(s), typically pertaining to particular software packages. Computers and other technical infrastructure usable with embodiments of the invention may be composed of any hardware that the computer software is intended to run on. Computers may be under control of any Operating System (OS). Computer software may be provided in a single package or multiple packages intended to run on one machine/and/or multiple machines at once. Computer software might be, but does not have to be, Blockchain software (nodes). Computer software might be, but does not have to be, supplied in the form of Containers adhering to the specifications of the Open Container Initiative (OCI). Multiple packages may be intended to cooperate with each other by exchanging data over a computer network, in which case an OAK Node can provide the necessary interfaces for such cooperation. System Overview:

In the following, a presently preferred embodiment of the invention is described in a schematic overview as illustrated in FIG. 1, which shows an OAK Node overview.

As shown in FIG. 1, a computing node (1) (hereinafter also referred to as "management node", "Node" or "OAK Node") is a computer program executable on a host operating system. The host system may be any system running on actual hardware and/or virtualized hardware, such as cloud instances. The OAK Node (1) can be installed on each user's (consumer's) device.

At least one of other programs, for example at least one of Store (6), CLI (7), 3rd party software (9) and/or remote control (10), may be installed on each user's device for the OAK Node (1) to be immediately useful. For instance, one embodiment of the present invention may be downloadable as a package and may comprise the OAK Node (1) and the Store (6) and may set up both to work with each other.

The OAK Node (1) bundled with the Store (6) may be downloaded to the user's machine from the internet, e.g., in the form of a compressed (zip) file to be extracted or an installer package specific to the user's operating system. Additionally, on Linux it may be packaged like any other software and available via the system package manager, such as apt-get on an operating system, for example debian/ubuntu.

As for the Configuration files (13), the Store (6), upon a user's request to run a specific software package (12), may first download a configuration file specific to this particular software, may then instruct the OAK Node (1) to read that configuration file and perform actions according to the file.

An OAK Node (1) may comprise one or several modules that perform internal tasks and/or provide interfaces for communication with external modules. More particularly, an OAK Node (1) may comprise any one of the following modules:

Container runtime (2) is a module that is able to spawn and execute Containers (11). The Container (11) is a sandboxed environment running on the host, using the host's operating system kernel while at the same time providing virtual operating system to the software (12) running inside the container. Container runtime (2) is responsible for creating and executing the Containers (11) and for communicating with the software running inside (12). To perform this task, the container runtime acts according to the supplied configuration files (13), which are also referred to as Templates. Templates are used by the Container runtime (2) to configure the container itself and to configure the software meant to be run.

Thus, it can be understood that the Container runtime (2) is a function that takes the configuration file(s) (13) and produces a new container (11) in a running state. A configuration file (13) may comprise a recipe for the Container runtime (2) to execute in order to build and run the container with specified software (12). To this end, the configuration file (13) may comprise any of the following information, or combinations thereof: where the software can be obtained, what are its dependencies, what are the required system settings, what are the required network settings (e.g., which ports to expose), what setup actions (e.g. shell commands) need to be performed, and/or what parameters to pass to the software (12) in order to run the software.

Along with this information, the configuration file (13) may also comprise values like name of the software, short description and metadata useful to Store (6) to display in its user interface (UI).

The Container runtime (2) manages the containers (11) during their lifetime and/or provides functions to start, stop, create, destroy and/or reconfigure the containers to the other OAK Node modules. The container (11) is a virtual environment for the software running within. It works both as a sandbox (so that the software running within (12) is unaware of the host operating system and cannot address or influence it directly) and as an operating system interface for the software within (so that from the software's (12) perspective, its runtime environment looks like linux). The container provides access to disk storage, network, memory, cpu and other resources of the host machine to the software running within (12).

The software (12) may implement a distributed ledger. The software (12) in FIG. 1 may be, for instance, an Ethereum client. In some embodiments, OAK Node (1) itself is not a distributed ledger as its state may be local and not synchronised with other OAK Nodes by the means of any distributed ledger protocol as it is not required. However, such protocol can be implemented within the existing Local database and algorithms (4) and the peer to peer networking (5), as shown in FIG. 1.

One OAK node (1) may be responsible for a plurality of containers (ii), as shown in FIG. 1. The creation and destruction of the containers (11) can be performed by the Container runtime (2) according to the user's instructions.

OAK API Endpoint (3) (also referred to as "programming interface") may be a (virtual) server that provides a unified API for programmatic control over OAK Node functions. This API can be used to build a host of different software programs suited to various aspects of OAK Node operation. In FIG. 1 there are a few of these programs, for example Store (6), CLI (7), 3rd party software (9) and remote control (10), each one of them uses OAK API to trigger various functions of the OAK Node (1) and/or obtain information about containers (11), software running within, contents of the database (4) etc. OAK API is meant to be consumed both locally and remotely (10) and can be used by OAK provided software, for example Store (6), CLI (7) and remote control (10) and/or 3rd party software (9) to enhance OAKs capabilities.

The various functions of the OAK Node (1) may include, but not be limited to the following: list local configuration files (13) and their contents, prepare a container (1) based on the provided configuration file (13), start a prepared container (11), stop a running container (11), destroy/delete a container (11), list running containers (11), set CPU, memory and/or network bandwidth quotas for a container (11), read current CPU, memory and/or network usage of a container (11), read textual logs from a container (11), pass parameters and/or files in/out of the container (11) (e.g., to communicate with the software (12)), expose an interface to the running software (12) (e.g. to create a network bridge between container (11) and host), send network message via peer to peer networking (5), obtain queue of network messages from peer to peer networking (5), discover peers and specific OAK Nodes (1) connected to peer to peer networking (5), write to the database (4), read from the database (4), trigger execution of any built in algorithm (4).

Any program that correctly connects and/or authenticates with the OAK API may trigger any of the above actions, e.g., by calling an appropriate specific path via HTTP GET or POST. Embodiments of the present invention may use the HTTP REST API with JSON payloads, or another mechanism, such as RPC (e.g., gRPC) or other means of communication, as it depends on the implementation of peer to peer networking (5).

The above listing of functions may be triggered via the API. Using these functions, one can implement custom algorithms in any programming language and technology that may or may not run on the same machine as the OAK Node (1).

One example could be an AI driven "bot" that analyses a user's crypto portfolio and market data, and then decides what the most beneficial staking strategy for this particular user is. The bot can then use the OAK API to start the required software (12) (a node) and issue transactions appropriate for the given network to stake the funds. That bot could repeat the process constantly maximising profit for the user while requiring minimal input for the user.

Such algorithm can be implemented in any of these programs, for example Store (6), CLI (7), 3rd party software (9) and remote control (10), as they share the same level of access to OAK API endpoint (3).

Since OAK Node provides programmatic control over running software packages, the API may be used to build systems that:

1. Control and orchestrate multiple OAK Nodes over network (it may be other OAK nodes installed on other users' devices, but it may also include nodes of multiple users if necessary), and/or 2. Automatically choose what software to run when based on external signals based on algorithms such as machine learning. For example, the software may include, but not be limited to, Ethereum, QTUM, RSK, Ripple and any other similar software that can be described by an OAK configuration file (13) and run in a container (12).

Local database and/or algorithms (4) may connect OAK Node's internal modules (e.g., container runtime module (2), OAK API endpoint module (3) and/or peer to peer networking module (5)) together. This module (i.e. local database and algorithms module (4)) defines behavior of the OAK Node (1) and implements necessary functions. The database may store a local state needed to perform tasks described in regards to the OAK Node (1).

Peer-to-peer networking (5) may be a module that connects every single OAK Node with the network of OAK Nodes (including other OAK nodes installed on other users' devices, but also including nodes of other users if necessary. Eventually, there can exist vast networks of OAK Nodes owned by multiple parties.) which can be either private (a set of nodes belonging to one entity) or public (where nodes belong to different entities). This module abstracts away the underlying P2P protocol so that other modules in the OAK Node can communicate freely. This mechanism can be used to form multi-node deployments and/or provide a routing layer which enables network access to the software packages running in any container on such network. Assuming that there exists a network of interconnected (by the means of peer-to-peer networking (5)) OAK Nodes (i), each possibly running a plurality of containers (ii) containing different software (12). Any of the OAK Nodes (1) (A) can query this network asking for example "what is the shortest network route to an active instance of a Ripple client", other OAK Nodes (1) on the network can then pass that query to their peers establishing a path between OAK Nodes. This path would run from (A) to the OAK Node (B) which has a running instance of Ripple. Then, (A) and (B) can become peers and Ripple RPC interface can be forwarded from (B) to (A), allowing instant access to the Ripple ledger from (A) even though (A) does not run Ripple locally.

Such P2P protocol will in effect enable efficient transacting with any node of any protocol that runs by the means of OAK. In order to achieve such mode of operation, peer-to-peer networking (5) may need to be able to as follows: broadcast messages to the peers, receive messages from peers, connect with a given peer, discover peers based on queries to other peers, and/or create tunnels between itself and its peers (e.g., via an SSH tunnel).

OAK Store (6) is a GUI program that exposes OAK Node capabilities and displays OAK Node state in a user friendly way. The state may include, but not be limited to the following: available configuration files and/or their contents, metadata about prepared containers, list of running containers, preferably with metadata, performance data on running containers, user settings for OAK and/or the particular containers e.g. quotas, list of known peers, data extracted from the software within containers e.g. balances, particular blocks and/or transactions, user's hardware and/or network benchmark results, additional information generated by Store (6), CLI (7), 3rd party software (9) and/or remote control (10) and used by Store (6), CLI (7), 3rd party software (9) and/or remote control (10), logs obtained from the containers and/or the OAK Node itself, keys used by the OAK, and/or information required by the software being run, such as wallet addresses, pool account information (excluding secrets).

OAK Store (6) may use OAK API to control the OAK Node (1) and to obtain information from the OAK Node (1). Downloading the software packages via the OAK Store (6) may be accomplished by just downloading Configuration files (13) that are read by the Container runtime (2) which initiates a process of downloading components of the container defined by those configuration files. This means that OAK Store (6) implements means to acquire, update and/or manage these configuration files (13).

The configuration file (13) may be downloaded from the OAK store (6) to the user's device, and the configuration file (13) may be converted to a new container (11) by the Container runtime (2). In addition, the data which can be downloaded from the OAK store (6) is "configuration file (13)".

OAK CLI (command line interface) (7) may be similar in principle to the OAK Store (6) with the main difference being in the user interface. OAK CLI (7) is meant for more technically inclined human users and/or for host environments where GUI is inaccessible (servers, cloud instances etc.).

OAK Mobile (10) may be a version of OAK Store meant for mobile devices. It may require an OAK Node running on a remote system and may not provide OAK Node functions local to the mobile device. The user can control the remote computer using the mobile device. It may be multiple computers belonging to the same user.

The Container runtime (2) does preferably not run on mobile devices, although it is possible to run the OAK Node (1) without the Container runtime (2) on a mobile device, for example to provide the routing layer functionality described above. However, as presented in FIG. 1, the OAK Mobile (10) is preferably a standalone client of the OAK Node (1) which is not running on the same mobile device.

All of the OAK Node functions may be available to the mobile device via the API (3) as it has the same access to the OAK Node (1) as the OAK Store (6). The only difference is that the API functions triggered from the mobile device are in fact happening on the system where the OAK Node (1) lives and not on the mobile device.

3rd party software (9) can be future software which uses the OAK Node (1) for some purpose, implemented by OAK and/or other entities, as described for the API (3).

FIG. 2 illustrates a more detailed conceptual view of an OAK Node (1). As explained above, an OAK Node can be seen as a container runtime intended for running decentralized software both in consumer hardware and/or server/cloud deployments. It may spin up containerized and/or sandboxed software packages based on templates. Additionally, OAK Node may have the capability of connecting with other OAK nodes to form public or private peer-to-peer networks in which the OAK Nodes can coordinate. This enables a wide range of possible use cases which are described below. The OAK API can be used to integrate with any kind of user interface, dashboard, 3rd party system or setup. In a way, it can be thought of as a backend building block that can spawn and/or maintain other nodes on demand.

In the following, another embodiment of the invention will be described with reference to FIGS. 7 and 8. It will be appreciated that the components and functionalities explained hereinafter may be freely combined with components and functionalities of the other embodiments described previously and hereinafter.

As shown in FIG. 7, OAK Node (100) is computer software composed out of interconnected modules (104 to 112), each performing specific functions and acting together in order to provide claimed functionality. Conceptually, OAK Node (100) of FIG. 7 is essentially similar to OAK Node (1) of FIG. 1, and the components and functionalities recited herein can be freely substituted between the described embodiments.

OAK Node (100) can run on any computer system (210), including mobile devices, physical or virtualized, regardless of its hardware architecture and operating system as long as it supports the Workloads (103) intended to be ran by the means of it.

FIG. 7 shows a detailed view of a single Node (100), however, there might be more Nodes (113) which form a network between each other by the means of Peer-to-Peer communication facilitated by (105) and (110) by the means of Peer-to-Peer connections (125) and (133).

Each Node (100) in the Network (200) has preferably the same form, function and/or capabilities as shown on FIG. 7 and the related description.

API Server Module (104) exposes Node (100) functions to the User by means of API Client (101) which can be another computer program as long as it implements the API (120) understood by the API Server Module (104).

The API (120) can be but not limited to JSON-RPC over HTTP, Websocket or Unix socket.

Such program (101) may or may not expose its own User Interface intended for human operator. For example, reference implementation of the invention includes both GUI and CLI versions of API Client (101).

More importantly, Node's operation is controlled by Manifests (115) being produced and supplied (135) by a human operator or generated by any kind of 3rd party computer program.

Manifests (115) are stored on a local Filesystem (109) or retrieved (132) from a Distributed Filesystem (110) whenever they are requested by Manifest Parser (108) or proactively. Manifests (115) are also referred to as configuration filed in other embodiments.

Distributed Filesystem (110) can be but does not have to be IPFS which facilitates addressing and sharing of files (115) between Nodes (100, 113) participating in the same Network (200) or all Nodes (100) in existence. Addressing and sharing said files is achieved by the means of network protocol (113) implemented by the Distributed Filesystem (110).

Manifests (115) are read (128) by Manifest Parser Module (108) from local Filesystem (109).

Manifests (115) can be text files or binary files formatted as YAML, JSON or any other format that supports expression of structured tree-like information.

As the semantic interpretation of Manifests (115) does not depend on their representation and only structure, it is possible to extend and modify the representation freely.

Workload (103) is an arbitrary package of Computer Software running inside a Container (102). For example: Ethereum Node (geth) or a PostgresQL Database.

Each Manifest (115) contains a structured recipe for downloading, configuring, executing and controlling particular software package which ultimately becomes a Workload or multiple Workloads (103).

Manifests (115) can include embedded scripts in any programming language understood by the Control Plane (111). They can also include text of configuration files and data needed to be placed and/or executed within the Container (102) together with the Workload (103).

Manifest parser Module (108) implements methods and algorithms necessary to transform input representation (115) to an internal tree-like representation (called Namespace)

understood by the Management Module (106) which is then stored (123) in Namespace Storage (107).

Manifest parser Module (108) analyzes each input Manifest (115), performs validation, macro substitution and merging of referenced Manifests while requesting (128) them from the Filesystem (109).

Namespace Storage (107) can be any persistent store facility such as, but not limited to, key-value stores like LevelDB. It's function is to store and retrieve parts of the Namespace whenever Management Module (106) requires them.

The Namespace, represented as a database or storage (107) is used by the Node (100) to represent any internal or external state it requires to perform its function. Information stored in the Namespace includes but is not limited to:

Manifests and their parts (115),
Variables and Constants shared between modules,
Current state associated with particular Containers (102),
Current state associated with particular Workloads (103),
Current state associated with other Nodes (113), Management Module (106) orchestrates operation of the Node (100) and its components, primarily the API (104), Peer-to-Peer (105) and Control Plane (111) modules.

Management Module (106) writes and retrieves (127) information to and from the Namespace (107) as necessary providing transient and persistent data storage for itself and other modules.

Management Module (106) can be in two way communication (126) with other Nodes' (113) Management Modules (106) by the means of Peer-to-Peer networking Module (105) and network connection to the respective Nodes (125).

Management Module (106) receives, processes and responds to requests received from the API Server Module (104) and triggers appropriate actions in response to them. These actions may include are not limited to:

Retrieving, reading and writing Manifest (115) files,
Running specific Workload or Workloads (103) or Container(s) (102) described by a specific Manifest (115),
Stopping and Resuming specific Workload or Workloads (103),
Reading and writing information from and to the Namespace (107),
Reading and writing information from and to the Filesystem (109),
Initiating synchronization of the Distributed Filesystem (110),
Triggering actions in the Control Plane (111) associated with a particular Workload (103) and Container (102).
Passing requests to other Management Modules (106) running on other Nodes (113) and handling their response,
Triggering actions within other Nodes (113),
Retrieving contents of Namespace (107) on other Nodes (113)

Management Module (106) might perform any of the actions listed above autonomously, or in response to a request (126, 122) coming from Peer-to-Peer Module (105) or the Control Plane (in).

Peer-to-Peer networking Module (105) and connections to peer Nodes may be used to form Networks (200) of Nodes (100).

In order to facilitate orchestration of Containers (102) and Workloads (103) across the Network (200) between Nodes (100), Management Modules (106) of the Nodes (100) must be able to exchange information as required by any Orchestration algorithm that may be implemented within such Network (200).

Control Plane (111) controls the underlying Container runtime (112) by the means of API exposed by it (130) in order to manage Containers (102).

Control Plane (111) controls the Workloads (103) running inside the containers (102) as prescribed by the appropriate Manifests (115) by the means exposed by any particular Workload (124) dependent upon their description in its Manifest (115).

Controlling the Workload (103) might mean:

Updating its configuration in any form required by the Workload,

Modifying the contents of the filesystem visible to the Workload in its Container (102), Running additional software and scripts within the Workload context, alongside the workload in its Container (102) or another Container, Communicating with the Workload by means of custom APIs and user interfaces exposed by the Workload.

Control Plane (111) upon receiving a request from Management Module (106) reads the desired state of Containers (102) and Workloads (103) from the Namespace (107) and attempts to bring the actual state to be exactly the same as the desired state.

In this process, the Control Plane (111) may:

Execute scripts associated with given workload in its Manifest (115),

Store and retrieve relevant information to and from the Namespace (107),

Order the Container Runtime (112) to perform actions upon Containers (102),

Order the particular Workloads (103) to perform actions and answer queries,

Expose or hide Container (102) Network Interfaces and Ports associated with the Workloads (103), Control Plane (111) constantly monitors both the Containers (102) and the Workloads (103) to in order to keep the actual state as close to the desired state and react to any changes of state.

Control Plane (111) is comprised of a set of common functions which perform actions mentioned above upon executing them. The functions may be called by the code of the Control Plane (111) itself or by the scripts passed in the Manifests (115) by the means if Control Plane's built in interpreter.

The Container Runtime (112) (such as Containerd, Moby/Docker or Kubernetes) is used to create, run and manage Containers (102) according to their description in Manifests (115) based on Container Images stored in the Filesystem (109, 129) and/or coming from Distributed Filesystem (110, 132) and/or coming from External Container Registry (114, 134) such as, but not limited to DockerHub.

The Container Runtime (112) has an ability to turn a Container Image downloaded from an external source into a running Container (102) with a Workload (103) inside.

The Container Runtime (112) abstract away actions regarding Containers (102) themselves.

The Container Runtime (112) may or may not be local to the Node (100) and the Containers (102) may or may not be local to the Container Runtime (112) depending on the implementation.

By using an OCI compliant Container Runtime (112), the Node (100) is compatible with existing Containerized software.

FIG. 8 presents a potential setup including three Nodes (100) running on separate Computers (210) connected into a Network (200).

Computers (210) are connected to a Computer Network or multiple networks at once (220) such as the Internet, virtual private network (VPN), local network (LAN), wireless network which facilitates addressing and exchange of information between them.

Network (200) can contain an unlimited number of Nodes (100) running in different localities, on different Computers (210) belonging to different parties, under the control of different Operating Systems on different Computer Architectures.

Network (200) allows to utilize all the functionalities of the Node (100) in plural. For example, instead of running one Workload (103), multiple Workloads can be run and orchestrated.

Each Node (100) in the Network (200) can function as an independent Node described in detail above.

Additionally, each Node (100) in the Network (200) may expose its API (120) and service Clients (101), allowing them to control all the Workloads (103) or groups of Workloads running in the entire Network or on groups of Nodes running in the Network.

Connections between Peer-to-Peer modules (105, 133) of the Nodes (100) facilitated via the Computer Network (220) allow the Nodes to exchange information in order to coordinate any and all tasks ordered between each other to enact user commands and orchestration algorithms prescribed by their programming.

Connections between Distributed Filesystem modules (110, 125) of the Nodes (100) facilitated via the Computer Network (220) allow the Nodes to exchange files such as Manifests (115) and Container Images used by the Container Runtime (112).

Workloads (103) running in the Network (200) by the means of Nodes (100) may communicate between each other (221) via the Computer Network (220) for their own needs, using their own protocols.

Nodes (100) existing in a single Network (200) may exchange information about their addresses to aid Workloads (103) in finding each other, providing Service Discovery functionality to the Workloads.

Nodes (100) existing in a single Network (200) may create a virtual network (VPN or other) on top of the Computer Network (220) for the purpose of facilitating communication between each other and the Workloads (103).

The Computer Network (220) may be a separate network for each of the connections denoted as (125), (133) and (221).

There might be multiple, separated Networks (200) co-existing in a single Computer Network (220).

Exemplary Applications:

1. OAK Store: "App Store" for Nodes

In the embodiment of FIG. 3, the Oak Store is a single OAK Node running on the user's computer together with a UI app that allows the user to interact with OAK node and spawned nodes easily.

This is intended for users with little or no technical skills who want to run distributed and/or decentralized software on their machine for their own purposes, whatever these may be.

A single user can now easily run staking nodes, participate in mining pools, run software for development and/or testing or use DApps (decentralized application) with their own nodes (rather than relying on 3rd party providers). OAK Node contained in the OAK Store also exposes an OAK API endpoint allowing for local programmatic control and/or usage with the OAK Mobile app that provides a remote control functionality for the OAK Store.

2. OAK Headless: Universal & Multiprotocol Blockchain Backend

As shown in FIG. 4, there is an OAK API. The horizontal lines are P2P connections. This is a simplified drawing. The hexagonal shapes inside the OAK Nodes represent different kinds of software running in OAK's containers, such as Ethereum, Ripple and/or Bitcoin. It is to illustrate that the OAK Node is capable of running different software packages.

OAK Node can be used to build multi-machine deployments that can run various other nodes on demand. OAK Headless replaces App-Store-like GUI with CLI and API for programmatic interaction. It allows developers and DevOps to quickly set up nodes on their machines for development and production. OAK Headless is essentially a universal, multiprotocol blockchain backend. OAK aims to be much more streamlined solution to currently available products (such as Kubernetes which takes time and effort to use).

OAK Headless can span over any number of servers virtual or otherwise, across clouds and physical machines because OAK nodes connect with each other peer-to-peer.

This kind of setup is ideal for:

Exchanges: can easily add new currencies by spinning up nodes for new networks, and only caring about their RPC (Remote Procedure Calls).

The steps on how the OAK nodes add currencies are as follows:

1) Identify a protocol that we want to connect

2) Identify the hardware requirements and the needed software

3) Prepare a configuration file (a template) based on the instructions provided for the particular software 4) Instruct an OAK Node to run a container based on the prepared configuration file 5) Update the configuration file when new versions of software are released or new requirements are discovered.

The OAK Node will provision and run the software according to the configuration file exposing the interface to that software (usually RPC)

Early/mass stakers: can easily configure a resilient system that will spin up new nodes as soon as new projects emerge and they acquire funds.

The steps on how the OAK nodes configure a resilient system are as follows: By running a multiple OAK nodes on multiple machines and connecting them with each other, they are able to negotiate between themselves and meet constraints like "at least 2 instances of Ripple must be running at all times." Whenever a failure occurs on one of the nodes (for instance due to hardware failure or power outage), the remaining OAK Nodes will pick up and ensure that there are at least 2 instances running. In practice, connecting OAK Nodes between each other is done by providing all of them with the same network key (a text file) that can be obtained from any of them. This can be done via OAK API.

Mining operations: can run their own nodes and miners on their existing hardware and have a fine grained, real time control over what is being mined. They can also quickly add new networks as they emerge.

The steps on how the OAK nodes perform such mining operations are as follows: As described in the previous point. First connect the nodes, then set up constraints telling the newly formed OAK network which mining software to run, on how many instances. Pass addresses and other information required by the mining software. When new protocols emerge and new OAK configuration files are created for them, or the user decides to mine something else, the user can change the constraints and allow his OAK network to swap the running software for the new software or change the proportions. This process can be driven via OAK API and become fully automated from the user's point of view.

Analytics companies: can run a number of nodes and multiplex the block data coming in.

Other entities that require various nodes running on their own infrastructure.

OAK headless can be controlled via OAK API by calling any of the running OAK Nodes. The Nodes will coordinate and provide optimal workload distribution and uptime. It is like having your own Infura, but not limited to Ethereum and running on your own infrastructure.

3. OAK SaaS: Solution for Users without their Own Infrastructure

In FIG. 5, the hexagonal shapes of the OAK Nodes represent different kinds of software running in OAK's containers, such as Ethereum, Ripple and/or Bitcoin. It is to illustrate that the OAK Node is capable of running different software packages.

OAK SaaS can provide a version of OAK Node which has the same properties as OAK Headless but is running on the 3rd party infrastructure (e.g. cloud infrastructure managed by OAK). This is a solution for those who need OAK functionality but do not have their own infrastructure. Once again, this can be compared to Infura but unlike Infura, OAK may run many different nodes and is not restricted to Ethereum. Furthermore, access to emerging networks can be provided on the same day as networks release their nodes.

Infura provisions and runs Ethereum nodes on AWS virtual instances. It is built specifically for Ethereum and only provides RPC interface to Ethereum. OAK is built to run virtually any software and expose its interfaces (again such as RPC). OAK is based on configuration files (templates) and based on them always provisions the software and its required runtime environment together. Additionally, OAK can be seen as an infrastructure itself, freeing its operators from re-creating common infrastructure elements, like lifecycle management, monitoring, security etc. This means that adding multiple protocols and new protocols becomes a configuration exercise instead of systems engineering exercise.

In the SaaS model, OAK can be paid with any currency supported by the platform. So it is instant nodes for coins.

FIG. 6 illustrates further functionalities of embodiments of the OAK Node of the invention.

OAK OS:

OAK OS may be substantially the same as OAK Headless but with additional foundation for hardware interaction. The additional foundation for hardware interaction may basically mean preparing a minimal linux distribution with an OAK Node preinstalled that can be enhanced with drivers for particular hardware and/or customised to run on particular hardware. At this stage, OAK technology is able to power new kinds of hardware aimed at crypto world.

Networked OAK:

In a scenario where multiple (possibly thousands) of nodes of different networks are managed by OAK, OAK Nodes can be connected into a P2P network with a routing layer on top. This may enable widespread availability of nodes for transaction purposes. Developers may embed lightweight OAK SDK in their apps, such as wallets or dapp interfaces instead of specific blockchain clients.

Smart AI/Meta Node:

Building on top of OAK OS, it may be possible to create algorithms that analyse what is the most profitable software to run given marked data and hardware information. These algorithms combined with ability to automatically exchange funds and/or ability to automatically spin up software using OAK may be used to implement an automated staking system that maximises user's profit at any given point in time.

Practical Implementation Example:

In a practical implementation example, embodiments of the invention, in particular OAK Nodes, may be regarded as belonging to a class of Container Orchestration solutions. The following resources are provided for technical background: OCI Scope Table (https://www.opencontainers.org/about/oci-scope-table), Docker (https://docs.docker.com/engine/docker-overview/), Kubernetes (https://kubernetes.io/docs/concepts/overview/what-is-kubernetes/). Some embodiments of an OAK Node may make use of one or more distributed filesystems, such as IPFS (https://docs.ipfs.io/introduction/overview/). Some embodiments of an OAK Node may utilize an "Infrastructure as Code" model, one prominent example being Terraform (https://www.terraform.io/).

Substantial technical benefits as compared to the prior art that are achievable with embodiments of the invention include by way of example and without limitation:

1. Designed to be used by less technical audience, which significantly expands the potential customer group, as less prior knowledge or experience is required. This is solved in some embodiments by applying a user-friendly interface and/or creation flow for the user to understand and decide what he/she wants to deploy.

2. More extensive and/or flexible manifests allowing the user to describe runtime, procedures and/or variables while being able to easily combine and/or edit them (Infrastructure-as-code). This may also result in improved infrastructure management in situations when it has to be merged or migrated to a new environment, for example during company acquisitions and/or expansion.

3. The manifests may be efficiently shared between companies and/or agents in order to replicate a given infrastructure stack, which may dramatically reduce the delivery time and/or remove the reinventing the wheel problem.

4. No dependency on centralised container repository. This characteristic may mitigate risks relating to single dependency of whoever manages the repository, which is very important in situations when the current storage provider decides to change interests and stops serving the product.

5. Built in signing and/or container verification between parties for higher software security, which ensures that the containers do not contain malicious additional parts of software which could extract information or override operations.

6. Built in service discovery facilities and health metrics, which may remove overhead from building additional software to provide visibility and/or debugging capacity to every part of the infrastructure stack each time the new stack is deployed.

7. Built in automated updates of 3rd party services.

8. Designed to support peer-to-peer systems, i.e., the infrastructure deployed via embodiments of the invention could sit on machines owned by independent entities and not only within one provider. The peer-to-peer design also may allow those machines to operate autonomously and/or detect any failures and/or downtime and/or decide to act and/or heal the system.

Exemplary further applications of embodiments of the invention include by way of example and without limitation:

The OAK engine of some embodiments of the invention has been designed to serve most infrastructure types and requirements, while being robust and resilient to downtime happening to the machines, network and/or storage. This allows the engine to be applied to various technological stacks being used in the most internet business models.

The OAK manifests of some embodiments of the invention are flexible to launch infrastructure for software ranging from simple microservices, web servers, load balancers as well as much more complex structures such as parallel computing stacks, such as Hadoop or Spark. This combined with its high availability capacity allows any business to easily configure express their needs through OAK Manifests and follow efficient deployment practices.

Furthermore, in some embodiments of the invention a basic setup can quickly grow into much more complex system due to extension of OAK manifest into new components and procedures, while the engine itself will take care of scaling and healing of those components.

This makes OAK according to embodiments of the invention a perfect case to be used for building PaaS and/or SaaS businesses with quick reusability or implementation of existing templates as well as allowing to wrap it into user friendly interface. Therefore, developers and specialists can choose to write their requirements using OAK templates (Infrastructure as Code) or there can be a front end application for less technical users which would abstract the technical configuration into more understandable objects and handle template generation for the user in the backend.

Aspects of the above solution have been successfully applied in the blockchain context serving decentralised protocols with provision of their block producing node clusters. This approach proved that embodiments of the invention are capable of specifying requirements and deployment of a new type of blockchain network infrastructure and to maintain high availability across the cluster. There are a lot of similarities and extension opportunities to allow OAK to be extended to also provision Serverless infrastructure within the same engine and templating language.

What follows are certain modifications, variations, improvements or omissions susceptible to embodiments of the invention:

The container runtime may be omitted, in which case OAK will not handle running the software. OAK's control plane can still work with software that is already running locally or remotely to perform actions and query for current values according to a Manifest.

The container runtime can be replaced with a different container runtime or any facility whose concern is to run a software package in any form. This allows OAK to work with different Container runtimes or even non-Container runtimes such as Serverless platforms.

Given the above, OAK Forests can be comprised of OAK Node instances controlling both Containerized and not Containerized software in one or many localities according to their Manifests.

Syntax of the Manifests can be changed to a different one without impacting the inner workings of OAK Node as long as the syntax translates to the Namespace representation.

Embedded scripting language for Actions and Variables can be substituted for another one without impact on the Control Plane as long as the scripts call Operators defined in the OAK Node.

IPFS backed storage for Manifests and Container Images can be substituted for any kind of storage capable of storing binary objects and retrieving them by hash. Depending on the choice of storage, this may impact decentralized properties of OAK Node but would not impact the inner workings.

Namespace storage could be substituted for any persistent key-value storage without impacting the inner workings.

Built-in peer-to-peer message queues exposed to the workloads.

Built-in log aggregation exposed to the workloads.

The computing systems (e.g., network nodes or collections of network nodes) on which an Oak Node system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded an them or may be encoded with computer-executable instructions or logic that implements the Oak Node system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The Oak Node system may be described in the general context of computer-executable instructions, such as program modules and components, executed by one or more computers, processors, or other devices. Generally, program modules or components include routines, programs, objects, data structures, and so on that perform tasks or implement data types of the Oak Node system. Typically, the functionality of the program modules may be combined or distributed as desired in various examples. Aspects of the system may be implemented in hardware using, for example, an application-specific integrated circuit ("ASIC") or field programmable gate array ("FPGA").

One embodiment of the present invention relates to a system to facilitate hosting of nodes of diverse blockchain systems, the system comprising: a template parser to parse templates that define access to node software; and a core for coordinating execution of node software based on parsed templates.

Oaknode V2

Design Overview and Suggested Implementation Approach

Oaknode V2 design has been developed based on premise that V1 architecture and implementation was insufficient to achieve our goals and proved to be extremely difficult to extend given loss of key developers. V2 aims at creating an extensible architecture based on proven open-source libraries, which will be easier to maintain and support over its lifetime. V2 design takes many lessons learned with V1 and new ideas that came to our attention over the past year while working on the OAK project.

Here are some of key drivers taken into account while designing new architecture:

No dependency on runtimes and VMs such as the JVM,

No need for centralized infrastructure to support OAK functionality,

Rich template language hiding details from the user while exposing all necessary functions, Safe, decentralized template authoring and update capabilities, Potential multi-wallet support and built-in functionality, Fine grained runtime configuration and analytics, P2P routing layer for guest RPC calls, Multi machine and private deployments including swarm management tools, Potential SaaS setup based on OAK, Various developer facing features, Potential pre-sync capability for various guest chains.

Golang has been determined as the implementation language of V2 after considering following factors:

There is a lot of proven open-source projects such as moby and libp2p being developed in that language—our developers could understand and use them directly, There is a lot of blockchain related software being developed in that language—again, our developers will benefit from a chance to understand such software, Given the above and Golang popularity in related fields, we might benefit from acquiring developers from these projects and/or open sourcing our codebase.

Golang developers are relatively easier to find than Clojure developers,

By giving up on Clojure we lose the JVM dependency which proved to be an obstacle for some users. Golang binaries are mostly independent and can be built for many platforms.

Components

This section briefly discusses each component presented in the drawing above. The drawing itself presents simplified internal architecture of the OAK node. Yellow boxes denote components that OAK needs to implement while green boxes are already existing.

CLI

The CLI is a command line program intended to be used by more technically inclined users. Its user interface (a set of commands) should be similar to what docker, npm or other package managers offer. It should expose all the features of OAK to the user, including template authoring tools and swarm management. This component should be treated as reference implementation of OAK JSON-RPC API client. Its function is to send user commands to a local or remote OAK Node instance and relay information back to the user.

GUI

The GUI is similar in its functionality to the CLI but it is intended to be used by less technically inclined users. Its user interface should expose most relevant functions of OAK to the user while using widely adopted graphical user interface paradigms known from app stores and popular apps. The GUI may contain other functionalities, not offered by the OAK Node itself, such as deep link support (handling OAK buttons), ability to join mining pools, social features etc. This is where convenience and ease of use meets the core functionality of OAK. The GUI should be implemented using web technologies and run locally either as a crossplatform electron app or a web service to be accessed locally or remotely in a web browser.

API Server

API server exposes all functions of OAK as JSON-RPC endpoint. The API is primary intended for consumption by the CLI and GUI but can and will serve anyone interested in controlling OAK Nodes or Swarms programmatically. It can be also used directly while building our SaaS solution. This API should be documented for outside consumption. JSON-RPC was chosen because of its widespread use in block-chain related projects and simplicity.

Core

Core module encapsulates business logic of the OAK node. It's job is to initiate and orchestrate all processes and operations performed by an OAK node. Core should keep track of all tasks (threads/goroutines) in flight, pass commands and results as events to and from different subsystems and external sources and provide logging and metrics on its operation.

Plugins

Plugins such as keygen and keystore will extend OAK Node capabilities. Those example plugins might help provide an internal multi wallet among other features. Plugins will be also used to extend the template language and control plane capabilities.

Template Parser

Template parser implements the OAK template language. Parser's job is to ingest templates in their YAML form, process and compile them into an internal representation stored in local database. The new OAK template language will include simple embedded scripting language. The parser will also compile expressions of that scripting language into a form that is executable by the control plane. Since all OAK templates will live under a global namespace, the parser shall verify the signatures to avoid overwriting owned sub-namespaces. The parser should also provide capabilities to produce yaml out of compiled templates and compare versions of templates.

Control Plane

The Control Plane is an internal service that controls and keeps track of running containers and the software within. When spinning up a container, the control plane instantiates a set of variables according to container's template in memory, backed by the leveldb. Control plane uses these variables to produce configuration parameters and values for both the container and the workload running within, based on the template definition. While the container is running, the control plane probes the status of the container and the software within and is capable of sending and receiving messages to and from the container. The Control Plane would handle things like probing the guest node status (i.e. how many blocks synced) via its appropriate RPC, probing resource usage and issuing guest node specific commands. To achieve these capabilities, the control plane must be scriptable by OAK template language and the templates must implement guest node specific interfaces.

Leveldb

A key-value store used to store the local configuration, OAK namespace (compiled templates), control plane variables and other information needed for operation. Basically, this is the local memory of an OAK node.

Libp2p

LibP2P from Protocol labs is used in IPFS. This library provides all necessary routines to build a distributed network of OAK Nodes, public and private Swarms. It also provides mechanisms like NAT hole punching and proxying which are a great fit for our routing layer plans.

Go-IPFS

IPFS will be used as a library to publish, retrieve and distribute templates and mirror docker images so that each OAK Node is also an IPFS node sharing necessary files with other OAK Nodes whilst removing the need to build a centralized storage.

Moby

Moby is open-sourced Docker. OAK Node will use Moby to configure, instantiate and run containers.

Implementation Strategy

Basic V2

Basic V2 implementation should match V1 functionalities while improving certain aspects like the template language. Basic V2 implementation will require building basic versions of some components while allowing others to be implemented at later stage.

To match V1 functionality, following items must be built:

Core
  Basic Job handling
  Basic Event hub
  Basic Event Types
  Get/Put routines for Leveldb
  Get/Put routines for IPFS for templates
API Server calls
  List available templates
  Run template
  List list running templates
  Get runtime stats of a running container
  Stop container for a template
  Remove images
  Purge volumes
Template parser
  Support YAML
  Downloading templates from IPFS
  Publishing templates to IPFS
  Basic namespace support
  Metadata section
  Container section
  Network section
  Basic Variables section
Control plane
  Basic Moby API client
  Pull image from DockerHub
  Run container
  Stop container
  List running containers
  Get runtime stats of a container
  Delete container
  Delete image
  Delete volume Additionally, we should establish a repo layout, basic build scripts and possibly a CI account to build nightly versions.

OAK Data Model and Templates

The foundation of OAK's data model is a notion of globally (as in around the globe) visible namespace containing all values needed by any oakd instance to function.

The namespace (NS) can be visualized as a tree, very similar to a filesystem tree, in which leafs are Values and edges are named forming Paths from the root to every leaf.

OAK nodes will store either the entire NS or just some of its subtrees while sharing the structure with each other. The whole NS could potentially be stored in a DHT.

Virtually anything can live in the namespace, from scalar values like ints and strings to contents of files (eg. for storing config file templates) or entire docker images or layers of thereof. The values need not to be stored on disk or memory of any kind, they can be also materialized by an appropriate party on read much like in the linux/proc filesystem does.

Paths

Paths are just like fs paths. For example, an absolute path: /foo/bar/baz

Where initial/denotes the root followed by a sequence of names delimited with /.

Names can contain letters, numbers, hyphens and pretty much any reasonable printable character with exception of /, :, $, @, ,, quotes, parens and braces, whitespace, newlines etc.

Relative Paths Resolution

The .name prefix has different meaning than in fs paths. . refers to the current context which has to be set somehow in various circumstances. For instance, in template YAML:

```
namespace:/foo/bar# sets the context in case of a YAML template
something:
   #... stuff ...
something-else:
   nested-something:
      inherits:/something # refers to /foo/bar/something
      quux:baz
      #...
   #...
```

The .. does not make sense and therefore it's not allowed.

Also, unlike a filesystem, there is no notion directories. Creating/foo/bar/baz: "bazinga". (value "bazinga" under/foo/bar/baz path) does not automatically create paths/foo and/foo/bar in the namespace. Notice that/foo/bar can point to another value so the following association is legal but not required:

```
/ foo /bar                 : "quux"
/ foo /bar /baz            : "bazinga"
```

Globbing

The NS should be queryable and paths like /x/*/y should resolve to a list of paths where which have a single name in place of *.

Similarily ** stands for multiple path segments.

Values

Let's take the example above. While submitted to the namespace, that YAML snippet would create some values, one of them would be: "baz".

Living under an absolute path/foo/bar/something-else/ nested-something/quux.

In this case, the value is a simple string and its path is a key to find it in the NS.

The values can be virtually anything that has a binary representation but they should be atomic i.e. do not posses complicated internal structure such as nested maps of arrays. That being said, the value can contain a script or structured data as text/binary that is intended for processing outside OAK, meaning that the value is treated as an opaque atom by OAK itself.

A type is just a name like int, string, float but we can have arbitrary types like file-template (which is also a long string) for storing while text files in NS, oak-script for storing OAK script snippets etc. Much like MIME types. (Note to self: perhaps we should use MIME?). Type name should be portable so that basically means it should be stored and transmitted as a string.

Here's a list of basic types of values:
numeric: int,
float (64 bit) bool
string, blob
And subtypes can be:
file-template—for storing config file templates
oak-script—for storing snippets path-descriptor—
for indicating types of NS sub trees etc. any
arbitrary named subtype Local NS and Montage Every OAK node has its own view of the NS but is free to mount parts of the global namespace under some path so for instance:

```
global /rsk                    -> local /rsk
global /oak/kerfuffle          -> local /sloth/pants
```

Similarly, the node could create paths that are only visible to itself and not publish them to the namespace. This could be used for example to store local node (or control plane) state.

Let's assume that there is a global path /rsk and it has control plane variable definitions inside, like:

```
/rsk/variables/block-height      : int
/rsk/variables/is-syncing        : bool
/rsk/variables/node-identity     : string
...
```

(details elided for brevity)

A node can use /rsk contents to spin up an RSK node and instantiate a control plane for it. Once the control plane starts its operation, the node will create and mount a local namespace: /local/rsk in which it will store the current values of variables:

```
/local/variables/rsk/block-height:    : 123456
/local/variables/rsk/is-syncing       : true
/local/variables/rsk/node-identity    : "quuxbaazblab"
...
```

From now on, the control plane refers to the /local subtree and mutates these variables and it does not touch the global /rsk mountpoint as it shouldn't be allowed to do that anyway.

Storage and Internal Representation

Each OAK node will store the namespace or its parts and will perform computation on it and based on it. Here, we propose that a key-value store such as LevelDB or BadgerDB could be used for storing values under their NS paths.

Mapping the NS to a key-value datastore is straightforward, the paths are keys and the values (annotated with their type) become, well, the values.

Looking from another standpoint, the namespace could be implemented as a hash table and possibly a distributed hash table (DHT) shared amongst the nodes.

Relation to YAML

OAK YAML files are human compatible way of creating the NS. Let's take an example:

```
namespace:/bohemian/rhapsody# everything in this file will go under
/bohemian/rhapsody
is:
   this:
      the:reallife?
   just:fantasy?
caught:
```

-continued

```
   in:a landslide
no:
   escape:fromreality
#...
``` this maps to the following NS content:

| /bohemian/rhapsody/is/this/the: | "real life?" |
|---|---|
| /bohemian/rhapsody/is/this/just: | "fantasy?" |
| /bohemian/rhapsody/caught/in: | "a landslide" |
| /bohemian/rhapsody/no/escape: | "from reality" |

The YAML key namespace must be the first key in the file and instead of being inserted into NS, it sets the NS context (prefix) for all the other keys in the file and is also used for. resolution in relative paths. The value for namespace must be an absolute path. inherits There are some YAML keys that have special meaning, first one is inherits:

```
namespace:/x
a:
   duck:
      says: "quack"
   b:
      inherits:/a/duck
      is: "a bunch of weebs"
``` which after processing will yield the following NS contents:

| /x/a/duck/says: | "quack" |
|---|---|
| /x/b/is: | "a bunch of weebs" |
| /x/b/says: | "quack" | inherits resolves a relative NS path and inserts the contents of that path as if they were on the same level that inherits is on.
defines defines is another special YAML key, it's not inserted into the NS, it's used to attach a value to a partial path. Like so:

```
namespace:/zoo
elephant:
   defines:animal
   lives:a poor life in captivity
cage:
   defines:building
   keeps:animals inside
``` will result in:

| /zoo/elephant: | "animal" (path-descriptor) |
|---|---|
| /zoo/elephant/lives: | "a poor life in captivity" |
| /zoo/cage: | "building" (path-descriptor) |
| /zoo/cage/keeps: | "animals inside" |

This is useful for annotating the NS subtrees with a meaning. In OAK context defines could have values like network, variable, containers etc.
Relation to IPFS For OAK's purposes IPFS is treated as a directory in which template YAML files are stored, it can be viewed as a filesystem directory which is shared amongst each and every OAK node.

YAML files that are stored in this directory are being loaded one by one and converted to the canonical form by applying transformations described above and then they are stored in the local KV store.
Preventing Unauthorized Modifications Since anyone can put anything on IPFS, it is important to prevent situations in which someone could overwrite a file belonging to someone else.

When company A publishes a template T to IPFS, its contents are hashed to form an IPFS address Addr(T).

An OAK node, upon reading the file T from IPFS will look for publisher's signature Sig(A, Addr(T)) in the same directory and verify it with publisher's public key stored elsewhere PubKey(A). If the file is signed by A, it means that it can be loaded under /A namespace safely since it originates from A.

Moreover, OAK node will look for Sig(OAK, Addr(T)) and verify with OAK's public key PubKey(OAK) to check whether the namespace modified by the file is officially supported and meant to be displayed in the GUI and/or CLI.
Template Language
Structure Templates are expressed in YAML, the nested structure described in a template is directly translated into a canonical namespace tree which is then interpreted by OAK node.

Here is a basic example template for Ethereum with some sections omitted for brevity:

```
namespace: /ethereum
common:
   protocol:
      defines: protocol
      name: Ethereum
      description: Ethereum is a global, decentralizedplatform for money
and new kinds of applications. On Ethereum, you can write code that
controls money, and build applications accessible anywhere in the world.
      currency: ETH
      Icon: ethereum.png
      website: https://www.ethereum.org/
      source:https://github.com/ethereum
      publisher: "OAKnode"
      white-paper: https://github.com/ethereum/wiki/White-Paper
      twitter: https://twitter.com/ethereum
      facebook: https://www. facebook.com/ethereumproject/
      reddit: https://www. reddit.com/r/ethereum/
   network:
      defines: network
      name: "mainnet"
      node-type: "full"
      consensus-type:"Proof of Work"
   requirements:
      defines : requirements
      CPU: "2 Cores"
      RAM: 4096
      GPU: true
      disk: 256000
   containers:
      defines: containers
      ethereum-node :
         image: docker.io/ethereum/client-go
         ports:
         - <- '$(host) : $ (p2p-port) : $ (p2p-port)/udp'
         - <- '$(host) : $ (rpc-port) : $ (rpc-port)/tcp'
         paths:
         - <- '$(volume) : $ (internal-volume)'
         entrypoint: <- '$(entrypoint)'
         bash: <- '$(bash)'
variables: defines:
variables
p2p-port:
type: int
value: 30303
rpc-port:
type: int
```

-continued

```
value: 8545
host:
type: string
value: "0.0.0.0"
volume: type:
string
   value: /tmp/ethereum
internal-volume:
type: string
value: "/root/.ethereum"
network: type:
string value:
" "
   syncmode:
type: string
value: full
entrypoint:
type: string
value: <- 'geth --syncmode $ (syncmode) $ (network) --rpc --rpcaddr
0.0.0.0'
bash:
type: string
value: " "
deposit-contract:
type: string
value: " "
mainnet-full:
defines: runnable
inherits: ./latest
mainnet-light:
   defines: runnable
   inherits: ./latest
   network:
      node-type: "light"
   requirements:
      disk.: 400
   variables:
      synomode:
         type: string
         value: light
#...
latest:
   defines: runnable
   inherits: ./v1.8.23
v1.8.23:
   defines: runnable
   inherits: ./common
   version: v1.8.23
   containers:
      ethereum-node:
         image-tag: v1.8.23
```

Structure

Each template MUST provide namespace at the beginning of the file. This statement tells the template parser to put everything that follows under the specified namespace.

After the namespace statement, any number of arbitrarily nested sections may follow, their meaning is determined later, when OAK node interprets the namespace contents while performing various actions.

The goal of nesting and inheriting in YAML is to avoid repetition and form runnable objects in the namespace easily.

Each value can be a script or variable reference.

Sections can be extended at any time with more fields and structure and more dpecial sections can be added to the language definition without breaking existing templates.

Sections

Each subtree containing defines key is a section that has a special meaning. The name of the section (key under which it is) is arbitrary, and thus defines key is what determines semantics of the section.

Protocol, Network, Requirements defines: protocol

A protocol section defines metadata about the protocol. This information can then be displayed to the user.

This section has the following fields which are optional:

name—name of the protocol description description in markdown currency coin or token symbol used by the protocol icon—path or url to an image file containing an icon website protocol's website url source—url to the source code publishey name of the entity publishing the software white-paper url to the whitepaper twitter—url to protocol's twitter facebook url to protocol's facebook reddit—url to protocol's reddit defines:network Network section is also descriptive like protocol and is to describe network specific metadata (since one protocol can have many networks).

Fields:

name—name of the network node-type—type (or flavor) of the software consensus-type—type of consensus algorithm that is used in this network defines: requirements Optional descriptive section, contains information about hardware requirements of the software. This information can be used to check whether the software will run on particular user's machine and is also displayed to the user.

CPU—required CPU type

RAM—required RAM size in megabytes GPU—whether

GPU is required disk—disk space required in megabytes

Containers defines:containers

Under this section are definitions of containers to be instantiated and executed. The format is similar to well known docker-compose. Each sub-section names and defines a single container.

Under each container sub-section there are definitions for:

image—which image to load (from dockerhub or

IPFS) image-tag—which image-tag to load ports—list of port mappings between the container and the host paths—list of path mappings between the container and the host entrypoint—path to an executable to run inside the container bash—shell command to run inside the container Variables defines:variables This sections defines variables to be instantiated on the control plane for a given runnable.

This section can contain any number of sub-sections, each defining a variable name and the following fields:

type—variable type, i.e. string, int value—preset value ask—whether to ask the user to set this variable manually description—human readable description of the variable Runnable defines:runnable Each valid runnable should contain one of every protocol, network, requirements, containers, variables.

OAK node, upon being requested to run a specified path, will check if the path was defined as a runnable and them, it will check if all required sub-sections are present within. runnable subtrees will be listed in the user interfaces and can be linked to by path, i.e. oak://ethereum/mainnet-light.

For instance, the example template in this document defines 4 runnable sections:

latest which is an alias for v1.8.23 v1.8.23 which inherits protocol, network, requirements, containers, variables from a non-runnable common and overrides some of the values.

mainnet-full which inherits the latest mainnet-light which also inherits the latest but overrides some values to change common settings.

These runnables will live under namespace defined atop, namely ethereum. And could be ran by issuing commands like:

```
oak run ethereum/mainnet-full
oak run ethereum/mainnet-light
``` etc.

Logically, runnables can be used to express different versions and flavors of the software, and any additional runnable artifacts associated with the software, like helper cli tools etc.

Embedded Scripting

Any value in YAML can be a script written in OAK's scripting language. The scripts might be as simple as reading a variable, or performing string interpolation, to more complex like making RPC or HTTP calls, performing calculations etc.

The language itself is simple, does not contain any way to loop or branch. Instead, scripts are composed from pre-defined operators that take some state and return new state, optionally taking arguments.

The scripts start with an arrow symbol ← followed by a sequence of variable references, constants and operator calls.

For example:

value: ←'geth---syncmode${syncmode}${network}--rpc--rpcaddr0.0.0.0' this script composes a string from constant strings and the contents of syncmode and network variables. Much like well known JavaScript string interpolation.

Variable Scope

Scripts have read access to variables defined in the variables section of any given runnable. The scripts cannot reach outside their runnable scope. Setting variables is done by specifying their values to be scripts like in example above.

Operators

Consider the following script:

```
value: <-                                      # the script will follow
$rpc-addr                                      # get 'rpc-addr' variable value
(1)
    json-rpc-call("net_peerCount")             # call 'json-rpc-call' oparator on the (1)
value
                                               # with additional argument
"net_peerCount"
                                               # produce value (2)
    on-error-return(0)                         # return 0 and exit if (2) is an
error
    get-json-rpc-result                        # parse (2) as JSON-RPC result producing
(3)
    parse-int(16)                              # parse (3) as hexadecimal integer
producing (result)
```

Starting from an rpc address defined as a variable, a chain of operators will run, passing intermediate values to each other in sequence. The result is a result of the last operator being run and it will be a number returned by parse-int(16)

LOAD and RUN

This document describes what happens during the LOAD and RUN procedures.

LOAD

Suppose we have the following template, it may come from foo.yaml or IPFS:

```
namespace: /hello
common:
    containers:
        defines: containers
        hello-world:
            image:hello-world
            image-tag:latest
world:
    defines:runnable
    inherits: ./common
```

Calling oak load foo.yaml will:

parse the yaml resolve special keys like namespace, defines and inherits put the template into the KV Store in the following form

| | |
|---|---|
| /hello/common/containers: path-descriptor) | "containers" (string, |
| /hello/common/containers/hello-world/image: | "hello-world" (string) |
| /hello/common/containers/hello-world/image-tag: | "latest" (string) |
| /hello/world: path-descriptor) | "runnable" (string, |
| /hello/world/containers: path-descriptor) | "containers" (string, |
| /hello/world/containers/hello-world/image: | "hello-world" (string) |
| /hello/world/containers/hello-world/image-tag: | "latest" (string) |

Run

This routine will look under the supplied path in the KV Store for a runnable and call docker to run the container(s) described by the runnable.

Suppose that after LOADing the above template, once the KV Store contents are like shown above, the users issues oak run/hello/world.

Here's what happens:

1. Find the template subtree in NSstore.Get("/hello/world") will return

"runnable" of type rt.stringValue equal to "runnable".

The "runnable" means that the subtree will contain at least a definitions of containers to run, here under /hello/world/containers. Which in turn holds "containers" meaning that its subtree is basically our version of docker compose.

If the path is not found in the NS, the Resolver should be called to find the template in the template index (skip for now).

If the path is not found and Resolver doesn't find it, barf. If the path is not "runnable", barf.

2. Get the Runnable Subtree and Search for Container defsstore.Search("/hello/world/**") will return a map:

| | |
|---|---|
| /hello/world/containers: path-descriptor) | "containers" (string, |
| /hello/world/containers/hello-world/image: | "hello-world" (string) |
| /hello/world/containers/hello-world/image-tag: | "latest" (string) | by iterating over the key-value pairs, find the path holding "containers". Here, it will be "/hello/world/containers".

Repeat store.Search with "/hello/world/containers/**" to get container definitions.

Here, we have just one for hello-world in the form of:

| | |
|---|---|
| /hello/world/containers/hello-world/image: | "hello-world" (string) |
| /hello/world/containers/hello-world/image-tag: | "latest" (string) | by dropping the /hello/world/containers prefix from the paths, we get:

| | |
|---|---|
| hello-world/image: | "hello-world" (string) |
| hello-world/image-tag: | "latest" (string) | which is easily translatable into a Go map:

```
{
    "hello-world." {
        "image": "hello-world",
        "image-tag": "latest",
    }
}
```

3. Call Docker

In this case, the container definition just contains the image to run, namely hello-world:latest.

So this step is an equivalent of running docker run hello-world:latest but performed with our internal docker client.

If the image is not locally present, it is necessary to try and download it before attempting to run.

More docker related options like port mappings, volume mappings and entrypoint etc. will have to be handled here. Consult the docker client definitions to see what is supported.

4. Register the Running Container Locally

Once the container is running, the oak node has to be aware of it and keep track of it in the NS state.

Starting the container should thus insert the relevant information under a local "mount point" which at the moment us just/local/containers. The KV Store contents should look roughly like this:

| | |
|---|---|
| \| runnable \| \| cont. name \| | |
| /local/containers/hello/world/hello-world: | "docker-container" |
| /local/containers/hello/world/hello-world/docker-id : | "12345" |
| /local/containers/hello/world/hello-world/status: | "running" |
| /local/containers/hello/world/hello-world/started-at: | 13453873820 (unix time) |

Notice how the runnable path in the/hello namespace is placed as a sub-tree under /local/containers and the hello-world name defined in the template becomes the container name under that sub tree.

OAK—Multimachine

The goal of multi machine is to have instances of oakd (oak nodes) communicate over internet or local network and coordinate between each other.

2 or more oak nodes can then form a Swarm where each oak node functions very much like the single machine version but additionally:

Can query its peers (knows the/local of peers)

Can issue commands to its peers (forwards RPC to peers)

The goal is to have ability to use oak CLI or any other oak client to call any of the nodes in a swarm and perform the same commands in multi machine context. This means that oak ps would show every running container across the swarm, oak run could indicate on which machine the containers should be spawned etc. Potentially, even containers from a single runnable could go on two separate machines and be able to communicate.

Requirements

Swarms should be private and communication between nodes should be encrypted using a swarm specific key i.e. user sets up 10 oak instances and provides each one of them with a key, thus, they can find each other and understand the messages.

Nodes in a swarm should "mount" contents of their peer/local into/swarm/<node-id> and keep track of metadata such as perceived IP address of any peer User should be able to call any node in a swarm to gain control over each node in the swarm The nodes shall reject all communication that is encrypted with a different key (since it's unreadable anyway)

Each node should be able to discover rest of the swarm by having only one peer from the swarm on its bootstrap list Nodes in the swarm should see each other as IPFS peers as well, Would be nice to abstract networking to have VPN like addressing inside the swarm for the docker containers

The invention claimed is:

1. A system for operating one or more computing nodes in a networked environment, comprising:

a management node comprising a container runtime, the container runtime operable to create one or more containers, each container providing a runtime environment for at least one software module; and an interface operable to remotely control one or more functions of one or more of:

the management node or the one or more containers, wherein, responsive to receiving an indication of a selected functionality from the interface, the management node is configured to:

(1) map the selected functionality to a selected set of software modules configured to perform the selected functionality, and (2) using the mapping automatically instantiate a corresponding set of containers to provide a corresponding runtime environment for the selected set of software modules.

2. The system of claim 1, wherein the container runtime is operable to perform at least one of creation or execution of the one or more containers in accordance with at least one configuration file.

3. The system of claim 2, wherein the at least one configuration file comprises one or more of: an indication of where the at least one software module can be obtained, an indication of one or more dependencies of the at least one software module, an indication of one or more required system settings, an indication of one or more required network settings, an indication of one or more setup actions to be performed, or an indication of one or more parameters to pass to the at least one software module.

4. The system of claim 1, wherein the management node further comprises a programming interface, operable to provide programmatic control over one or more functions of at least one of: the management node or the one or more containers, and wherein the one or more functions include one or more of: list at least one of local configuration files or contents of the local configuration files, prepare a container based on the local configuration files, start the prepared container, stop a running container, destroy/delete the container, list the running container, set at least one of CPU, memory, or network bandwidth quotas for the container, read at least one of current CPU, memory, or network usage of the container, read textual logs from the container, pass at least one of parameters or files in or out of the container, expose an interface to a running software, send network message via peer-to-peer networking, obtain queue of network messages from the peer-to-peer networking, discover peers and specific management nodes connected to the peer-to-peer networking, write to a database, read from the database, or trigger execution of an algorithm.

5. The system of claim 1, wherein the management node further comprises a peer-to-peer networking module, operable to communicate with other computing nodes of the networked environment.

6. The system of claim 1, further comprising a graphical user interface, operable to control the one or more functions of at least one of: the management node or the one or more containers.

7. The system of claim 1, further comprising a command line interface, operable to control the one or more functions of at least one of: the management node or the one or more containers.

8. The system of claim 1, wherein the management node further comprises a programming interface, operable to provide programmatic control over one or more functions of at least one of: the management node or the one or more containers, further comprising one or more of: a graphical user interface or a command line interface, wherein one or more of: the graphical user interface or the command line interface are operable to control the one or more functions of at least one of: the management node or the one or more containers, wherein one or more of: the graphical user interface or the command line interface uses the programming interface to control the one or more functions of at least one of: the management node or the one or more containers.

9. The system of claim 1, wherein the at least one software module implements a distributed ledger.

10. A computer-implemented method for operating one or more computing nodes in a networked environment, comprising:

creating, by a container runtime of a management node, one or more containers, each container providing a runtime environment for at least one software module, wherein the management node is configured to dynamically redistribute computational workloads among other computing nodes of the networked environment;

receiving an indication of a selected functionality from a user interface communicatively connected to the management node; and responsive to receiving the indication of the selected functionality, (1) dynamically associating the selected functionality with a selected set of software modules configured to perform the selected functionality, and (2) using the association, automatically instantiating a corresponding set of containers to provide a corresponding runtime environment for the selected set of software modules.

11. The method of claim 10, wherein the creating is performed in accordance with at least one configuration file.

12. The method of claim 11, wherein the at least one configuration file comprises one or more of: an indication of where the at least one software module can be obtained, an indication of one or more dependencies of the at least one software module, an indication of one or more required system settings, an indication of one or more required network settings, an indication of one or more setup actions to be performed, or an indication of one or more parameters to pass to the at least one software module.

13. A computer program comprising instructions for implementing a method of claim 10.

14. A non-transitory computer-readable medium storing computer-executable code for operating one or more computing nodes in a networked environment, the computer-executable code executable by a processor to:

receive an indication of a selected functionality from an interface;

map the selected functionality to at least one software module configured to perform the selected functionality; and using the mapping, automatically instantiate, by a container runtime of a management node, one or more containers using one or more composable configuration templates shared between the management node and a different management node in the networked environment, wherein each container is configured to provide a runtime environment for the at least one software module, and wherein the management node is configured to directly communicate with other computing nodes of the networked environment.

15. The non-transitory computer-readable medium of claim 14, wherein the container runtime is operable to perform one or more of: a creation or execution of the one or more containers in accordance with at least one configuration file.

16. The non-transitory computer-readable medium of claim 14, wherein the management node further comprises a programming interface, operable to provide programmatic control over one or more functions of at least one of: the management node lor the one or more containers.

17. The non-transitory computer-readable medium of claim 14, further comprising one or more of: a graphical user interface or a command line interface, wherein one or more of: the graphical user interface or the command line interface are operable to control one or more functions of at least one of: the management node or the one or more containers.

18. The non-transitory computer-readable medium of claim 15, wherein the at least one configuration file comprises one or more of: an indication of where the at least one software module can be obtained, an indication of one or more dependencies of the at least one software module, an indication of one or more required system settings, an indication of one or more required network settings, an indication of one or more setup actions to be performed, lor an indication of one or more parameters to pass to the at least one software module.

19. The non-transitory computer-readable medium of claim 16, wherein one or more functions of at least one of the management node or the one or more containers include one or more of: list at least one of local configuration files or contents of the local configuration files, prepare a container based on the local configuration files, start the prepared container, stop a running container, destroy/delete the container, list the running container, set at least one of CPU, memory, or network bandwidth quotas for the container, read at least one of current CPU, memory, or network usage of the container, read textual logs from the container, pass at least one of parameters or files in or out of the container, expose an interface to a running software, send network message via peer-to-peer networking, obtain queue of network messages from the peer-to-peer networking, discover peers and specific management nodes connected to the peer-to-peer networking, write to a database, read from the database, or trigger execution of an algorithm.

20. The system of claim 1, wherein the container runtime operable to perform at least one of creation or execution of one or more containers using one or more composable configuration templates shared between the management node and a different management node.

* * * * *